United States Patent [19]
Barnsley et al.

[11] Patent Number: 5,857,036
[45] Date of Patent: Jan. 5, 1999

[54] SYSTEM AND METHOD FOR THE FRACTAL ENCODING OF DATASTREAMS

[75] Inventors: Michael F. Barnsley, Duluth; Anca Deliu; Ruifeng Xie, both of Atlanta, all of Ga.

[73] Assignee: Iterated Systems, Inc., Atlanta, Ga.

[21] Appl. No.: 610,302

[22] Filed: Mar. 4, 1996

[51] Int. Cl.$^6$ ............................... G06K 9/36; G06K 9/46
[52] U.S. Cl. ........................................... 382/248; 382/244
[58] Field of Search ................................. 382/249, 247, 382/248, 244, 232, 233; 364/715.02, 715.04; 341/67, 107; 395/612; 358/426, 261.2

[56] References Cited

U.S. PATENT DOCUMENTS

| | | | |
|---|---|---|---|
| 4,941,193 | 7/1990 | Barnsley et al. | 382/249 |
| 5,347,600 | 9/1994 | Barnsley et al. | 382/249 |
| 5,416,856 | 5/1995 | Jacobs et al. | 382/249 |

OTHER PUBLICATIONS

"An Introduction to Arithmetic Coding", Glen G. Langdon, Jr.; *IBM J. Res Develop.*, vol. 28 No. 2, pp. 135–149, Mar. 1994.

"Universal Modeling and Coding", Jorma Rissanen and Glen G. Langdon, Jr.; *IEEE Transactions on Information Theory*, vol. IT–27, No. 1, pp. 12–23, Jan. 1981.

"Entrophy, Transinformation and Word Distribution of Information–Carrying Sequences", Werner Ebeling, Thorsten Pöschel and Karl–Friedrich Albrecht; *International Journal of Bifurcation and Chaos*, vol. 5, No. 1, pp. 51–61, 1995.

*A Block–sorting Lossless Data Compression Algorithm*, M. Burrows and D.J. Wheeler; Digital Equipment Corporation, 1994.

*Primary Examiner*—Phuoc Tran
*Attorney, Agent, or Firm*—Morris, Manning & Martin, L.L.P.

[57] ABSTRACT

A system and method for compressing and decompressing datastreams with fractal coding is disclosed. The method includes the generation of an optimal data set transformation function corresponding to a representative datastream captured from a data source. The data set transformation function is determined by ordering the digits of the representative datastream to order the intervals of an attractor. The ordered intervals are then used to determine the mapping functions which define an optimal data set transformation function. The nodes or graphical representation of the data set transformation function are incorporated in a compressor/decompressor combination. The compressor receives data symbols from a data source and determines the next interval of an attractor using a composition operation. The address or a portion of the address is shifted out as a number representative of the data symbols. Preferably, the interval is renormalized so the interval may be represented in sixteen bits. The decompressor receives the number and determines the data symbol value that corresponds to the number in relation to an identified interval. The corresponding data symbol is shifted out and the mapping function corresponding to the data symbol is applied to the identified interval to determine a next interval. The mapping function is applied using a composition operation. The next interval and number are then preferably renormalized and used as the identified interval for the next number received from the compressor. The inventive system includes a buffer for capturing a representative datastream, a data symbol arranger to order strings of the captured datastream, a mapping function generator to generate the mapping functions of the transformation function and a compressor/decompressor combination.

26 Claims, 4 Drawing Sheets

SYSTEM AND METHOD FOR THE FRACTAL ENCODING OF DATASTREAMS

FIELD OF THE INVENTION

This invention relates to data compression methods, and more particularly, to lossless data compression methods.

BACKGROUND OF THE INVENTION

Bandwidth limitations in various data transmitting media have led to the development of methods for "compressing" data. Compression generally refers to the representation of a set of data by using fewer elements than contained in the set to represent the set of data. If each data element within the set may be regenerated from the compressed representation then the method is commonly known as lossless. If the data representation regenerated from the compressed representation of the data set does not accurately represent each and every element within it, the method is known as lossy. Because the set of compressed data may represent all elements but contain fewer elements than the actual set represented, the transmission of the compressed data usually requires less time and fewer resources than if the original set of data was transmitted. Conversion of the transmitted compressed data set is called decompression and is usually performed by a receiver to obtain the original data set or a close approximation thereto. Thus, the compressed data must not only be capable of accurately representing the data set, but it must also contain sufficient information for the receiver to decompress the data representation.

One known method for compressing a data set uses a data set transformation function to represent a data set. The data set transformation function may be constructed out of projective, affine or complex mapping functions that, when applied to any data set in iterative fashion, converges to the same attractor. As a result, the coefficients of the data set transformation function may be used to represent a data set that is substantially the same as the attractor. This type of compression method is known as an iterated function system or IFS. This type of compression method is lossy as the attractor usually approximates the data set and does not exactly reproduce the data set.

One lossless compression method which uses iterated function systems is disclosed in *Fractal Image Compression* by Michael F. Barnsley and Lyman P. Hurd, AK Peters Ltd., 1992. The section entitled Arithmetic Compression and IFS Fractals discusses the use of iterated function systems to encode a datastream from a zero-order Markov source. To generate the mapping functions used to compress the data from such a source, a sample datastream is collected from the data source and the frequency of occurrence for each symbol in the datastream is computed. These frequencies are then used to find the coefficients for a mapping transformation having the general form:

$$w_i(x) = p_i x + t_i \text{ for } i=1,2,\ldots,n$$

where the $p_i$ for $i=1,2,\ldots,n$ are independent probabilities for each of the symbols in the datastream. The mapping transformations computed from the representative datastream are then used to compress subsequent datastreams from the zero-order Markov source and the mapping transformations are utilized to construct a decompressor as well.

While the compressor/decompressor combination for this zero-order Markov process compresses datastreams for this type of source, it fails to efficiently compress data from higher order Markov sources or other stochastic processes in which the generation of the symbols are not truly independent. Specifically, most data communicated between systems today are not independently generated streams of the binary symbols 1 and 0. Rather, there is a long term correlation between the binary representation of the words, for example, in a word processing program as most of the documents generated by a particular word processing program are written in a particular language, say English. As a result, the output of that program would tend to have certain words reoccurring on a regular basis. Because the system described above views the generation of the symbols as being completely independent, the correlation between the frequency of occurrence of the symbols is not used to more efficiently compress the datastreams generated by such stochastic processes.

What is needed is a lossless method of compression using iterated function systems which efficiently encode and decode datastreams for stochastic processes in a way which incorporates the long term data correlation for such sources.

SUMMARY OF THE INVENTION

The limitations of the systems and methods previously known have been overcome by a system and method performed in accordance with the principles of the present invention. The method of the present invention includes the steps of capturing a representative datastream from a data source, determining an optimal data set transformation function from the representative datastream, and incorporating the optimal data set transformation function in a compressor/decompressor combination to be used to compress and decompress datastreams from the data source. Set forth in more detail below, the optimal data set transformation is comprised of mapping functions which are preferably piecewise linear functions determined from the sample datastream by ordering intervals of an attractor in correspondence with the values of the data symbols comprising the datastream. These mapping functions more efficiently encode data by incorporating long-term data correlation present in the datastream generated by the data source. The data set transformation function constructed in accordance with the method of the present invention may also be used to construct a decompressor using the inverse of the optimal data set transformation function for efficiently decompressing the data from the compressor.

To construct an optimal data set transformation function which may be used by the method of the present invention, a datastream is received from a data source which is considered a stochastic process since the generation of data symbols by the source are correlated in the long term. In accordance with the principles of the present invention, the cyclical permutations of the symbols comprising this datastream correspond to intervals of an attractor which forms the one-dimensional linear graph of the interval 0–1 which may be represented by the notation [0,1). These intervals are then ordered and the graph of the mapping functions or the nodes of the mapping functions which comprise the data set transformation function are generated. These mapping functions may then be incorporated in a compressor and used to compress other datastreams generated by the data source. The symbols of an incoming datastream are used to drive the compressor to determine an interval on the interval [0,1) which may be used to represent the datastream. The address of this interval is transmitted by the compressor to represent the datastream. After digits of the address have been shifted out, the interval is preferably renormalized so it conforms to sixteen bit binary representation.

The decompressor of the present invention receives the address or a portion of the address and determines the portion of an interval identified by a dynamical system in the decompressor that corresponds to the address. This interval portion is used to generate and shift out a data symbol which was originally in the datastream before compression. A mapping function of the optimal data set transformation function corresponding to the data symbol is then applied to the identified interval and the resulting interval is renormalized. The process continues until all of the data symbols have been generated. The decompressor terminates the iterative process once the number of symbols generated equals the length of the original datastream. The length of the original datastream may be a parameter passed to the decompressor by the compressor.

The system and method of the present invention may be used to generate compressor/decompressor combinations which more efficiently compress datastreams generated by stochastic processes. Such compressor/decompressor combinations are tailored to the output of a stochastic data source by incorporating the optimal data set transformation function based on the long term correlation of the symbols in the datastreams generated by the stochastic process.

These and other advantages and benefits of the present invention may be ascertained from a review of the detailed description and the accompanying drawings.

BRIEF DESCRIPTION OF DRAWINGS

The accompanying drawings, which are incorporated and constitute a part of this specification, illustrate a preferred and alternative embodiments of the invention and, together with the general description given above, and the detailed description of the embodiments given below, serve to explain the principles of the invention.

DETAILED DESCRIPTION OF INVENTION

Figure 1:
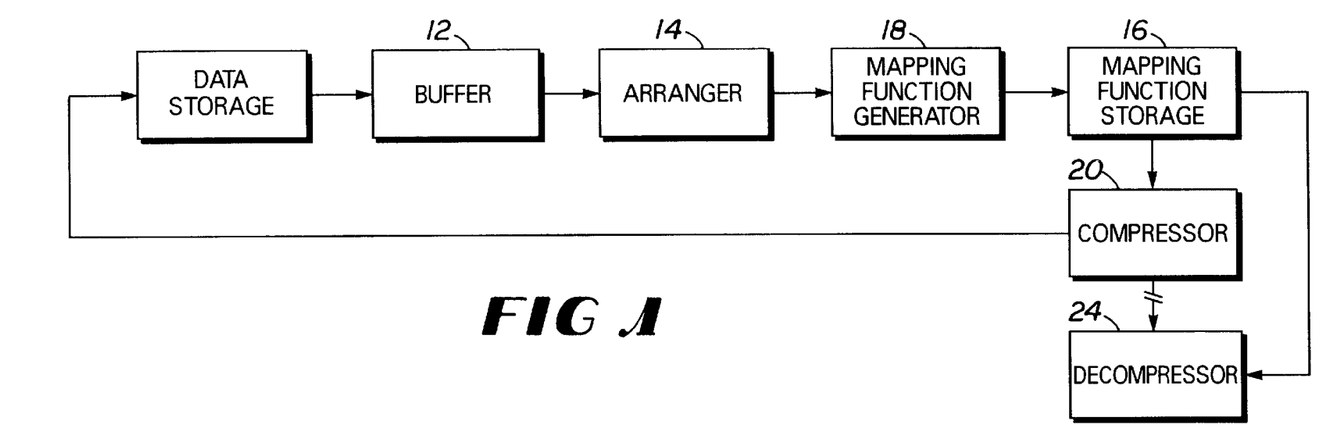
FIG. 1 is a block diagram of a system which implements the principles of the present invention.

FIG. 1 shows a system for generating the data set transformation function installed in a compressor and decompressor, respectively, for stochastic data sources. The system 10 includes a buffer 12, a data symbol arranger 14, a mapping function generator 18, a memory for mapping functions 16, a compressor 20, and a decompressor 24. Buffer 12 is comprised of memory storage elements which are used to store data symbols of a representative datastream captured from the output of a stochastic data source. The capacity of the storage buffer may be the same as a datastream normally output by the data source, the length of a standard message output by the data source, the length of the longest datastream output by the source, or the length of an average datastream. Data symbol arranger 14 is used to arrange the symbols of the datastream stored in buffer 12 into ordered strings or vectors based upon the values of the data symbols. These ordered strings are then provided to mapping function generator 18 for determination of the mapping functions which comprise the data set transformation function incorporated in compressor 20. The mapping functions are stored in memory 16 and transmitted to compressor 20 and decompressor 24 of a compressor/decompressor combination. Thereafter, the datastream is provided to compressor 20 for compression and the compressed representation is transmitted to decompressor 24. Decompressor 24 uses a dynamical system response to decompress or decode the compressed representation generated by compressor 20.

Data symbol arranger 14, mapping function generator 18, memory 16, compressor 20, and decompressor 24 are preferably implemented by a computer program operating on a general purpose computer such as a personal computer or the like, although other computer systems may be used. The programs implementing each of these elements are preferably written in the C programming language and are executed on computer systems operating under a DOS or Windows environment, although other operating systems may be used. The computer platform has at least an Intel 80/286 processor, 8 MB of RAM, 240 MB of hard drive, or the equivalent thereof. Buffer 12 is preferably comprised of the RAM elements of the system, although a separate capture and storage board may be implemented for the buffer. The output of the mapping function generator 18 may be a graphical representation or a set of nodes defining the mapping transformation function which may be used in a compressor/decompressor combination. Thus, the mapping functions output by mapping function generator 18 adapt a compressor/decompressor combination to more efficiently compress a datastream from a stochastic data source.

The method and system of the present invention is used to identify an interval on a one-dimensional attractor on the range of [0,1). Preferably, this attractor is divided into k equal sized segments where k corresponds to the number of symbols in a datastream. For a binary datastream, the mapping transformation function for an iterated function system and its corresponding dynamical system is comprised of two mapping functions $w_0$, $w_1$ which correspond to the data symbols 0,1, respectively. In general, a dynamical system is a pair (f, X) where X is a space and f:X→X is a mapping. An iterated function system (IFS) is a collection of mappings $\{w_j\}$, $w_j$:X→X. The inverse of a particular IFS is its corresponding dynamical system.

For purposes of discussing the present invention, X denotes the code space of all binary data strings, that is, the code space for semi-infinite binary data strings of zeros and ones. The shift operator $S(s_1 s_2 s_3 \ldots) = s_2 s_3 \ldots$ is the map that drives the dynamical system of the present invention. The associated IFS for the shift operation S is comprised of two mapping functions $s_0^{-1}(s_1 s_2 \ldots) = 0 s_1 s_2 \ldots$ and $s_1^{-1}(s_1 s_2 \ldots) = 1 s_1 s_2 \ldots$. That is, the $s_0$ operator shifts a zero into the most significant digit position and the $s_1$ operator shifts a one into the most significant digit position. This (dynamical system, IFS) pair for the code space has a corresponding (dynamical system, IFS) pair on the unit interval. The function S(x) may be defined as:

$$2x, \quad 0 \leq x \leq 1/2$$
$$2x - 1, \quad 1/2 \leq x \leq 1$$

then $S^{-1}(x) =$ $$s_0^{-1}(x) = x/2, \quad 0 \leq x \leq 1$$
$$s_1^{-1}(x) = x/2 + 1/2, \quad 0 \leq x \leq 1$$

This (dynamical system, IFS) may be used to express a datastream comprised of data symbols in the code space as an IFS operating on [0,1). However, the IFS expression of the binary digit representation does not reduce the amount of data required to identify the datastream.

One can find an IFS which reduces the amount of data required to identify a datastream for a class of datastreams. This class may be defined by its probability measure which is related to a cumulative distribution function, F, for the stochastical process identified by the output of a data source. The relationship between F and $\mu$ may be stated as $F(x) = \mu$ [0,x]. For purposes of discussing the present invention, the stochastical process is assumed to be time invariant. For those datastreams corresponding to F, the IFS compresses the datastream. For other datastreams the IFS expands the representation of the datastream. The IFS which compresses the representation of datastream described by F is denoted as W and is called an optimal IFS for F. For a binary datastream, W is comprised of mapping functions $w_0, w_1$ and W and F are related as follows:

$$w_0(x) = F(F^{-1}(x)/2)$$
$$w_1(x) = F(F^{-1}(x)/2 + \frac{1}{2})$$

Thus, to find an optimal IFS for a data source, one needs to determine the $w_0, w_1$ that define W.

Once an optimal IFS is found for a binary data source, a binary string of data symbols, $s_1 s_2 \ldots s_n$, with each symbol having a value of zero or one, may be represented by the interval $w_{s1} \cdot w_{s2} \cdot \ldots \cdot w_{sn}[0,1)$. This interval is determined by applying the mapping functions $w_0, w_1$ to the interval [0,1) in correspondence to the values of the data symbols comprising the string. That is, the address of the interval representing the string is found by determining $w_{s2} \cdot w_{s\,1} \cdot \ldots \cdot w_{sn}[0,1)$. For example, the string 01101 is represented by the interval determined by $w_0 w_1 w_1 w_0 w_1 [0,1)$. The method of the present invention enumerates all cyclic permutations of a datastream and orders them according to their binary magnitude. The order of the permutations correspond to an ordering of the intervals comprising an attractor on the interval [0,1).

The method implemented by the present invention is best introduced with reference to an example. By way of example, and without unnecessarily limiting the principles of the present invention, system 10 and the method implemented therein is discussed with respect to a datastream $s_1 s_2 \ldots s_n$ comprised of five binary digits 00111. Each binary digit is viewed as being the result of a mapping function applied to a prior interval which is represented by another one of the digits in the stream. The stream is also considered to be cyclical in that the first digit of the stream is deemed to be the result of the application of a mapping function to the last digit in the stream. For purposes of the example, the binary digits correspond to the intervals of an attractor on the interval [0–1) which are equal in length and are designated by $T_1, T_2, T_3, T_4$, and $T_5$, respectively.

In the method and system of the present invention, the values of the datastream in buffer 12 are assumed to be a string repeated infinitely by the data source. Accordingly, the data symbol values may be used to approximate a probability measure and corresponding cumulative distribution function F which in turn may be used to define $w_0, w_1$ of W, the optimal IFS for such a data source. According to the method of the present invention, the values and order of the data symbols are used to order n equal intervals in the [0,1) interval to determine the interval invariant that represents the application of W to the representative datastream. That is, the invariant interval $T_1 = w_{s1} \cdot w_{s2} \cdot \ldots \cdot w_{sn} (T_1)$. Since the interval $T_1$ has a length $1/n$ then the representation of a string on n symbols is achieved with $\approx \log_2 n$ bits. Thus, identifying $T_1$ using the data values in buffer 12 compresses the data string contained in the buffer. This interval may be used to optimally compress the representative datastream and the n circular shifts of that datastream. It also compresses datastreams of m bits which have at least $\log_2 n$ contiguous bits which are the same as any group of digits of the same length in the representative datastream used to generate W.

Expressing the correlation relationship between the digits, each interval represented by a digit is expressed as the application of a mapping transformation to its following digit. That is, $T_1 = w_0 (T_2)$, $T_2 = w_0 (T_3)$, $T_3 = w_1 (T_4)$, $T_4 = w_1 (T_5)$, and $T_5 = w_1 (T_1)$, in the example noted above. This set of equations represents the relationships which are used to account for the correlation between successive binary digits. Specifically, the first binary digit 0 in the stream is for the interval $T_1$ and it is generated by applying the mapping function $w_0$ to the $T_2$ interval. Likewise, the second binary digit 0 represents the application of the $w_0$ mapping function to the interval $T_3$ represented by the first binary digit 0 in the stream. Whether the interval is a result of applying the mapping function $w_0$ or $w_1$ is determined by the state of the binary digit itself. That is, if a binary digit is equal to 1 then it is the result of the application of the mapping function $w_1$ to the following interval. If a digit is equal to 0, it is the result of applying $w_0$ to the following interval. The above relationship provides $T_1 = w_0 w_0 w_1 w_1 w_1 (T_1)$. This means that $T_1$ is the invariant interval that results from the application of W to $T_1$ according to the representative datastream in the example. The ordering of the T intervals defines the mapping relationships $w_0, w_1$. If the data string used to determine the ordering of the intervals and consequently, the optimal IFS for the compressor, is compressed, the output of the encoder is the interval $T_1$ of length $1/n$. This interval needs $\log_2 n$ or $\log_2 n + 1$ bits to define it as opposed to the n bits required to define the original data string. Thus, the original data string has been losslessly compressed.

Important to the principles of the present invention are the relationships that $w_0 (t) \leq t \leq w_1 (t)$ for $t \in [0,1]$ and $w_0[0,1) \cup w_1[0,1) = [0,1)$ and $w_0[0,1) \cap w_1[0,1) = w_0(1) = w_1(0)$. These relationships mean that $w_0(0) = 0$ and $w_1(1) = 1$. These relationships state that the application of the $w_0$ mapping function results in an interval having an address that is less than the address of the interval to which it was applied and the application of the $w_1$ mapping function to an interval results in an interval having an address which is greater than the address of the interval to which it was applied. This in turn means that any point in the image of $w_0$ is less than or at most equal to any point in the image of $w_1$. Additionally, the mapping functions $w_0, w_1$ are piecewise linear with nodes at the ends of the n intervals into which the interval [0,1] is divided. The functions $w_0, w_1$ have slopes of either 0 or 1 between the nodes. For any interval, the slope of $w_0$ and $w_1$ are different and $w_0 (t) \leq t \leq w_1 (t)$. Using these relationships, the data symbol arranger 14 divides the datastream into two subsets where one subset is comprised of zero digit symbols and the other is comprised of one digit symbols. Accordingly, $T_1$ and $T_2$ must be equal to or less than $T_3$, $T_4$, and $T_5$ in the example above since the zero symbols represent intervals generated by the application of $w_0$ to a prior interval and the one symbols were generated by the application of the $w_1$ function.

These subsets are then provided to mapping function generator 18 which orders the elements in each subset to obtain an overall order for the intervals. For example, since $T_1=w_0(T_2)$ and $T_2=w_0(T_3)$, then $T_1=w_0(w_0(T_3))$. Since the application of $w_0$ makes the resulting interval less than the interval acted on, generator 18 determines that $T_1 \leq T_3$ since $T_1$ is the result of the double application to $T_3$ of $w_0$ and $T_2$ is the result of a single application of $w_0$ to $T_3$. This relationship may be used to ascertain that $T_1 \leq T_2 \leq T_3$. As a result, all five intervals may now be ordered to form the attractor for the range of 0 to 1 which corresponds to the input datastream. This ordering of the intervals represented by the binary digits of the datastream is shown graphically in FIG. 2.

Figure 2:
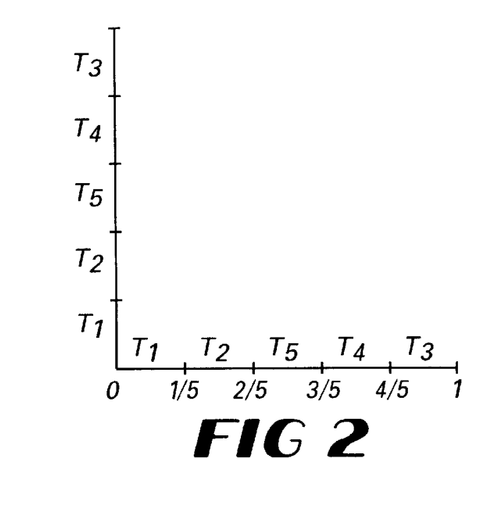
FIG. 2 is graphical depiction of an example of the ordering of attractor intervals based on an exemplary datastream.
Figure 3:
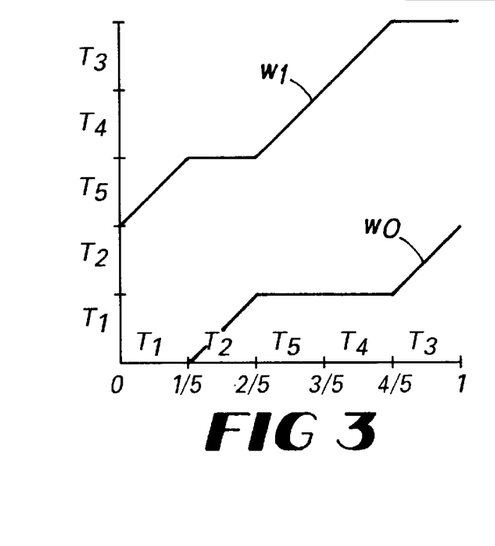
FIG. 3 is a graphical depiction of the mapping functions which correspond to the intervals of FIG. 2.

The corresponding mapping functions $w_0$ and $w_1$ for the ordered intervals of FIG. 2 are also graphically shown in FIG. 3. Specifically, the intervals on which one of the functions $w_0$ or $w_1$ is increasing over the range means that the mapping function is being applied to the interval to generate a next interval. Thus, in the example shown in FIG. 3, $w_0$ is applied to interval $T_2$ while the mapping function $w_1$ is applied to the interval $T_3$, and so on. The application of these mapping functions which comprise a mapping transformation W correspond to the correlation relationships noted above between the intervals and the mapping functions. The graphical representation of the mapping transformation or equivalent thereof may now be incorporated in a compressor to encode datastreams from the data source used to generate the mapping transformation W.

A more general description of the method implemented by the system of the present invention is now presented. To begin the process, the datastreams stored in buffer 12 may be generally described as a stream comprised of symbols $s_1$, $s_2$ ... $s_n$. For binary data, each symbol may be either a 1 or 0 digit. Data symbol arranger 14 begins by segmenting the datastream into vectors of contiguously valued symbols. The symbols $z_1$, $z_2$, ..., $z_p$ represent contiguous zero digit vectors while $n_1$, $n_2$, ..., $n_p$ represent contiguous one digit vectors in the datastream. Let $k(1)$, ..., $k(p)$ be the number of zeros in the corresponding $z_1$, ..., $z_p$ vectors and let $z_{ij}$ be the jth zero in the $z_i$ vector. For instance $z_{34}$ will denote the 4th zero in $z_3$ vector. Similarly let $l(1)$, ..., $l(p)$ be the number of ones in the corresponding $n_1$, ..., $n_p$ vectors and denote by $n_{ij}$ the jth one in the $n_i$ vector. The intervals $T_1, T_2, ..., T_{n-1}, T_n$ of the cyclic permutation may be identified with the corresponding starting data bit. That is:

$T_1 \ T_2 \ ... \ T_{n-1} \ T_n$
$s_1 \ s_2 \ ... \ s_{n-1} \ s_n$ so that $s_2$ stands for $s_2 s_3 \ ... \ s_n s_1$. By ordering the ones and zeros of the data string, the corresponding intervals are also ordered. This process begins by ordering the ones and zeros in a table manner.

| $z_{1,1}$ | $z_{2,1}$ | ... | $z_{p,1}$ |
| $z_{1,2}$ | $z_{2,2}$ | ... | $z_{p,2}$ |
| . | . | ... | . |
| . | . | ... | . |
| . | . | ... | . |
| $z_{1,k(1)}$ | $z_{2,k(2)}$ | ... | $z_{p,k(p)}$ | and

-continued

| $n_{1,1}$ | $n_{2,1}$ | ... | $n_{p,1}$ |
| $n_{1,2}$ | $n_{2,2}$ | ... | $n_{p,2}$ |
| . | . | ... | . |
| . | . | ... | . |
| . | . | ... | . |
| $n_{1,l(1)}$ | $n_{2,l(2)}$ | ... | $n_{p,l(p)}$ |

In this arrangement, the elements of each z column are increasing from top to bottom so that any element on a row is smaller than any element on a lower row. Thus, for instance, $z_{2,1} \leq z_{2,2} \leq ... \leq z_{2,k(2)}$ and $z_{2,2} \leq z_{3,4}$. The first group of inequalities follow from $w_0(t) \leq t$. That is, the elements of the top row of the z vectors correspond to a one more application of $w_0$ than an element in a lower row. On the other hand, the elements of each n column decrease from top to bottom so that any element on a row is larger than any element on a lower row. That is, the top elements of the n vectors correspond to more than one application of $w_1$, while the elements of the lower rows require less applications of $w_1$. By ordering the elements of the bottom row, the order of the remaining elements follow according to these relationships discussed above.

The ordering of the vectors begins by determining whether any of the n vectors are of non equal length. If they are then the z vectors are ordered first. Otherwise, the n vectors are ordered first. The criterion used to order the elements of the z vectors is an evaluation of length of the n vector follows a z vector. For example, to order $z_j$ and $z_k$, the length of the n vector following $z_j$ is compared to the n vector following $z_k$. The z vector followed by the shorter n vector is determined to be greater than the other z vector. For example, if the n vector which follows $z_j$ is shorter, i.e., has fewer elements, than the n vector which follows $z_k$, then $z_j > z_k$. If the n vectors which follow $z_j$ and $z_k$ are equal, then $z_j$ and $z_k$ are grouped together and the process proceeds by finding the position of the group $\{z_j, z_k\}$ with respect to the other z vectors. The determination of the relationship between $z_j$ and $z_k$ is postponed for the following iteration.

Following the first iteration in the ordering of the z vectors, the process continues by performing the first iteration in the ordering of the n vectors. These vectors are ordered according to the order of the z vectors following each n vector. The second iteration for the ordering of the remaining z vectors uses the partial ordering of the n vectors. That is, a z vector followed by a n vector which is less than another n vector following a second z vector determines the ordering of the two z vectors. For example, if the n vectors following $z_j$ and $z_k$ have been ordered so that the n vector following $z_j$ is less than the n vector following $z_k$, then $z_j > z_k$, by the monotonicity of $w_1$. Successive iterations of ordering the z and n vectors based on the ordering derived from the previous iteration eventually order all of the z and n vectors.

By way of example, the order of the datastream having digits 1100011100011000 is now described. First each of the data symbols are assigned an interval designation of $T_1$ to $T_{16}$ beginning with the leftmost digit to the rightmost respectively. The intervals are related by $T_1=w_1(T_2)$, $T_2=w_1(T_3)$, $T_3=w_0(T_4)$, $T_4=w_0(T_5)$, $T_5=w_0(T_6)$, $T_6=w_1(T_7)$, $T_7=w_1(T_8)$, $T_8=w_1(T_9)$, $T_9=w_0(T_{10})$, $T_{10}=w_0(T_{11})$, $T_{11}=w_0(T_{12})$, $T_{12}=w_1(T_{13})$, $T_{13}=w_1(T_{14})$, $T_{14}=w_0(T_{15})$, $T_{15}=w_0(T_{16})$, $T_{16}=w_0(T_1)$. Using the relationship $w_0(t) \leq t \leq w_1(t)$, the stream can be ordered:

$T_3 \leq T_4 \leq T_5$
$T_9 \leq T_{10} \leq T_{11}$ and $T_{14} \leq T_{15} \leq T_{16}$ In this arrangement, an interval in a column is smaller than any interval in a column to its right. For example, $T_{14} \leq T_4$ since $T_{14}=w_0(w_0(w_0(T_1)))$ and $T_4=w_0(w_0(w_1(T_1)))$. The intervals on a column are then ordered by examining the length of the string of ones that follow each one. In this case, $\{T_{16},T_{11}\} \leq T_5$ since $T_5$ is followed by three ones while $T_{16}$ and $T_{11}$ are followed by two ones. This ordering provides $\{T_{15},T_{10}\} \leq T_4$ and $\{T_{14},T_9\} \leq T_3$. This follows from $T_{11} \leq T_5$ and applying $w_0$ so that $w_0(T_{11}) \leq w_0(T_5)$ which, from above, is $T_{10} \leq T_{14}$. The other orderings may be similarly determined. In ordering the strings of ones, the relationships:

$T_2 \leq T_1$ $T_8 \leq T_7 \leq T_6$, and $T_{13} \leq T_{12}$

This order provides the information that an interval in one column is less than an element in a column to its right. Further, by applying $w_1$ to $\{T_{14},T_9\} \leq T_3$ the relationship $\{T_{13},T_8\} \leq T_2$ is determined which in turn means that $\{T_{12},T_7\} \leq T_1$. Returning to the zero string ordering, $T_1$ and $T_{16}$ may now be ordered by applying $w_0$ to $T_{12} \leq T_1$ to determine that $T_{11} \leq T_{16}$. At this point, all of the intervals in the image of $w_0$ have been determined and may be stated as: $T_9 \leq T_{14} \leq T_3 \leq T_{10} \leq T_{15} \leq T_4 \leq T_{11} \leq T_{16} \leq T_5$. Returning to the one string ordering, $T_{13}$ and $T_8$ may now be ordered by applying $w_1$ to $T_9 \leq T_{14}$ to determine that $T_8 \leq T_{13}$. At this point, all of the intervals in the image of $w_1$ have been determined and may be stated as: $T_8 \leq T_{13} \leq T_2 \leq T_7 \leq T_{12} \leq T_1 \leq T_6$. Since any interval in the image of $w_0$ is smaller than any element in the image of $w_1$ then $T_9 \leq T_{14} \leq T_3 \leq T_{10} \leq T_{15} \leq T_4 \leq T_{11} \leq T_{16} \leq T_5 \leq T_8 \leq T_{13} \leq T_2 \leq T_7 \leq T_{12} \leq T_1 \leq T_6$.

This example may be stated more succinctly in the following manner. The data string s=1100011100011000 may be used to determine the maps $w_0$, $w_1$ which are piecewise linear with nodes at the points k/16, k=0, ..., 16. The intervals T correspond to the digits in the data string as follows:

| $T_1$ | $T_2$ | $T_3$ | $T_4$ | $T_5$ | $T_6$ | $T_7$ | $T_8$ | $T_9$ | $T_{10}$ | $T_{11}$ | $T_{12}$ | $T_{13}$ | $T_{14}$ | $T_{15}$ | $T_{16}$ |
|---|---|---|---|---|---|---|---|---|---|---|---|---|---|---|---|
| 1 | 1 | 0 | 0 | 0 | 1 | 1 | 1 | 0 | 0 | 0 | 1 | 1 | 0 | 0 | 0 |

The zero digit vectors $z_i$ and the one digit vectors $n_i$ for the string are:

| $n_1$ | $z_1$ | $n_2$ | $z_2$ | $n_3$ | $z_3$ |
|---|---|---|---|---|---|
| s = 11 | 000 | 111 | 000 | 11 | 000 | or by letting the zeros be elements in the z vectors and the ones be elements in the n vectors, the string is:

| $n_{11}$ | $n_{12}$ | $z_{11}$ | $z_{12}$ | $z_{13}$ | $n_{21}$ | $n_{22}$ | $n_{23}$ | $z_{21}$ | $z_{22}$ | $z_{23}$ | $n_{31}$ | $n_{32}$ | $z_{31}$ | $z_{32}$ | $z_{33}$ |
|---|---|---|---|---|---|---|---|---|---|---|---|---|---|---|---|
| 1 | 1 | 0 | 0 | 0 | 1 | 1 | 1 | 0 | 0 | 0 | 1 | 1 | 0 | 0 | 0 |

The intervals [0,1/16], [2/16,3/16], ..., [15/16,1] are denoted by names $T_1, T_2, \ldots, T_{15}, T_{16}$ in an order subject to the conditions $T_1=w_1(T_2)$, $T_2=w_2(T_3)$, ..., $T_{15}=w_{15}(T_{16})$, $T_{16}=w_{16}(T_1)$. Since there are runs of different lengths, the zeros are first ordered by checking the runs of ones that follow them to yield:

| $z_3$, | $z_2$ | $\leq$ | $z_1$ |
|---|---|---|---|
| $T_{14}$ | $T_9$ | | $T_3$ |
| $T_{15}$ | $T_{10}$ | | $T_4$ |
| $T_{16}$ | $T_{11}$ | | $T_5$ |

Any interval on a row is smaller than any interval on a lower row because the interval on the lower row is a composition generated from fewer applications of the $w_0$ mapping function. In an alternative notation the table above is:

| $z_3$ | $z_2$ | $\leq$ | $z_1$ |
|---|---|---|---|
| $z_{31}$ | $z_{21}$ | | $z_{11}$ |
| $z_{32}$ | $z_{22}$ | | $z_{12}$ |
| $z_{33}$ | $z_{23}$ | | $z_{13}$ |

Using the partial ordering for the z vectors determined thus far, i.e. that $n_1$, $n_2$ precede $z_1$, $z_2$

| $n_3$ | $n_2$ | $\leq$ | $n_1$ |
|---|---|---|---|
| $T_{12}$ | $T_7$ | | $T_1$ |
| $T_{13}$ | $T_8$ | | $T_2$ | can be deduced or in an alternative notation

| $n_3$ | $n_2$ | $\leq$ | $n_1$ |
|---|---|---|---|
| | $n_{21}$ | | |
| $n_{31}$ | $n_{22}$ | | $n_{11}$ |
| $n_{32}$ | $n_{23}$ | | $n_{12}$ |

Since $z_2$ is followed by $n_3$ and $z_3$ is followed by $n_1$:

| $z_2$ | $\leq$ | $z_3$ | $\leq$ | $z_1$ |
|---|---|---|---|---|
| $T_9$ | | $T_{14}$ | | $T_3$ |
| $T_{10}$ | | $T_{15}$ | | $T_4$ |
| $T_{11}$ | | $T_{16}$ | | $T_5$ |

Finally, since $n_1$, $n_2$ are followed by $z_1$, $z_2$ respectively:

| $n_2$ | $\leq$ | $n_3$ | $\leq$ | $n_1$ |
|---|---|---|---|---|
| $T_6$ | | | | |
| $T_7$ | | $T_{12}$ | | $T_1$ |
| $T_8$ | | $T_{13}$ | | $T_2$ |

Figure 4:
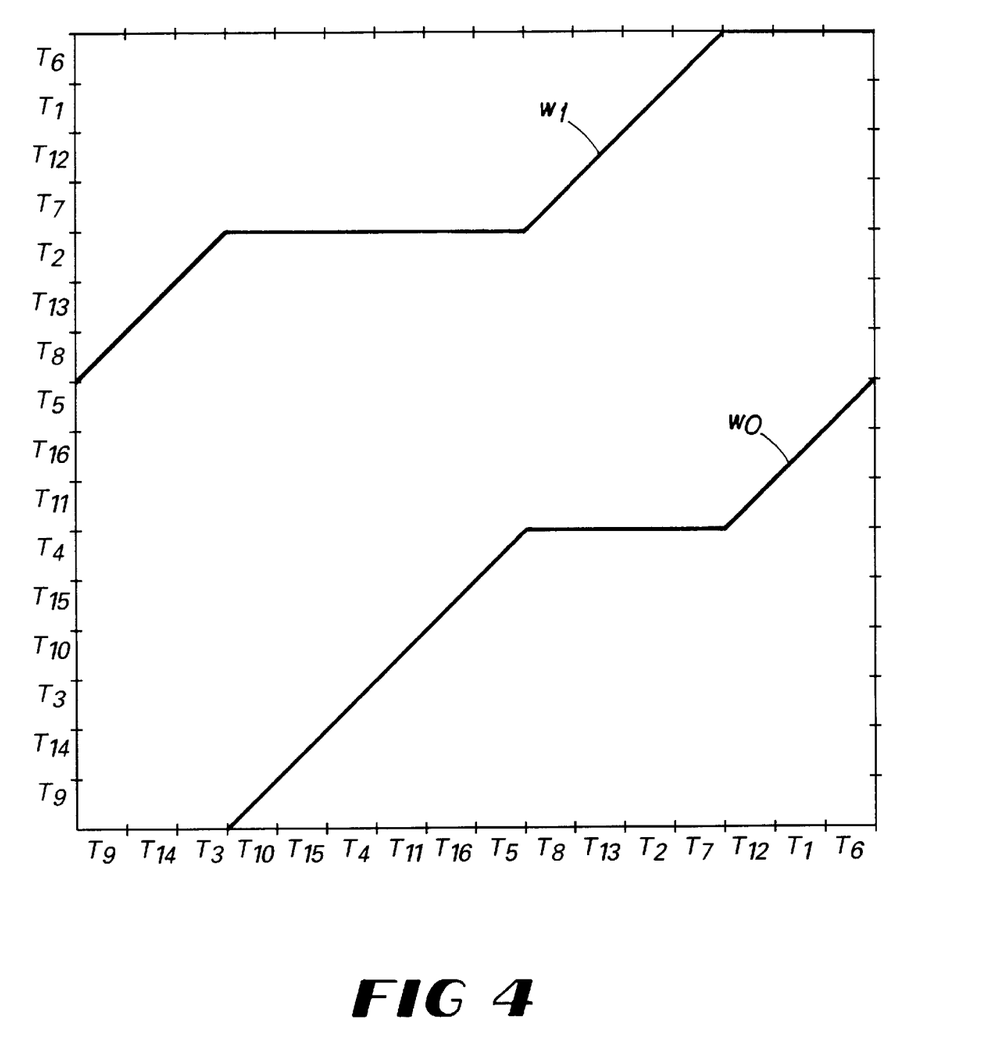
FIG. 4 is an example of ordering the intervals of an attractor based on the symbols in a datastream and the corresponding mapping functions.

Thus, the order of the intervals in the image of $w_0$ are:
$T_9 \leq T_{14} \leq T_3 \leq T_{10} \leq T_{15} \leq T_4 \leq T_{11} \leq T_{16} \leq T_5$
and the order of the intervals in the image of $w_1$ are:
$T_8 \leq T_{13} \leq T_2 \leq T_7 \leq T_{12} \leq T_1 \leq T_6$,
which gives:
$T_9 \leq T_{14} \leq T_3 \leq T_{10} \leq T_{15} \leq T_4 \leq T_{11} \leq T_{16} \leq T_5 \leq T_8 \leq T_{13} \leq T_2 \leq T_7 \leq T_{12} \leq T_1 \leq T_6$,
In other words, $T_9=[0,1/16]$, $T_{14}=[1/16,2/16]$, $T_3=[2/16,3/16]$ and so forth. The graphs of the corresponding $w_0$ and $w_1$ are shown in FIG. 4.

The graphical data of the mapping functions or equivalent thereof, such as identification of the nodes of the intervals, may be used by a compressor to encode data. The compressor is optimally "tuned" to encode a data stream like the one used to generate the mapping functions. Compression of a data string is achieved by using a composition operation with the piecewise linear maps, like the ones shown in FIG. 4, to identify an interval within the [0,1] range that represents the data stream.

To implement the composition operation for two piecewise linear mapping functions, the nodes of the functions are identified. The nodes are the points in the function where the slope of the function changes between 0 and 1. The nodes for $w_0$ may be denoted as $\{(s_i, x_i)\}$ and the nodes for $w_1$ may be denoted as $\{(t_i, y_i)\}$. For the $w_0$ nodes, $s_0, s_1 \ldots s_m$ are ordered from the smallest to the largest on the interval [0,1) and the $x_i$ are determined by $x_i=w_0(s_i)$. Likewise, the $t_i$ are so ordered and the $y_i$ are determined by $y_i=w_1(s_i)$. Between any two consecutive nodes, the graph of $w_0$ respective of $w_1$ is the line segment connecting the two node points. For $s_{k-1} \leq s \leq s_k$ and $t_{k-1} \leq t \leq t_k$, the values of $w_0(s)$ and $w_1(t)$ are:

$$w_0(s) = x_{k-1} + \frac{x_k - x_{k-1}}{s_k - s_{k-1}} (s - s_{k-1})$$

and $$w_1(t) = y_{k-1} + \frac{y_k - y_{k-1}}{t_k - t_{k-1}} (t - t_{k-1})$$

The composition $w_0 \cdot w_1$ includes nodes from both $w_0$ and $w_1$. Specifically, $w_0 \cdot w_1$ has the value $w_0(y_i)$ and for those $s_i$ in the image of $w_1$, at the points $w_1^{-1}(s_i)$, $w_0 \cdot w_1$ has the value $x_i$. Thus, the nodes of $w_0 \cdot w_1$ are $\{(t_i, w_0(y_i))\} \cup \{(w_1^{-1}(s_i), x_i)\}$ where some points may repeat each other. By ordering the $t_i$ and $w_1^{-1}(s_i)$ the nodes of $w_0 \cdot w_1$ and thus, $w_0 \cdot w_1$ are determined. The values for $w_0(y_i)$ and $w_1^{-1}(s_i)$ are computed using the equations given above.

For example, the composition operation may be used with the mapping functions of FIG. 4 for the binary substring 01 within the sixteen bit string discussed above in the following manner. The string 01 indicates a composition operation $w_0 w_1[0,1]$ which may be represented as $w_0 \cdot w_1$. With reference to FIG. 4, the nodes $(s_i, x_i)$ of $w_0$ are (0,0), (3/16,0), (9/16,6/16), (13/16,6/16), and (1,9/16) and the nodes $(t_i, y_i)$ of $w_1$ are (0,9/16), (3/16,12/16), (9/16,12/16), (13/16,1) and (1,1). The nodes $s_i$ in the image of $w_1$ are (9/16,6/16), (13/16,6/16), and (1,9/16). These values may be used in the equations given above to find the points $\{t_i, w_0(y_i)\}$ which define $w_0 \cdot w_i$. They are (0,6/16), (3/16,6/16), (9/16,6/16), (13/16,9/16), (1,9/16), (0,6/16), (10/16,6/16), (13/16,9/16), (14/16,6/16), (15/16,6/16), and (1,6/16). Because some of these nodes are redundant, $w_0 \cdot w_1$ may be determined by the nodes (0,6/16), (10/16,6/16), (13/16,9/16), and (1,9/16).

Figure 5:
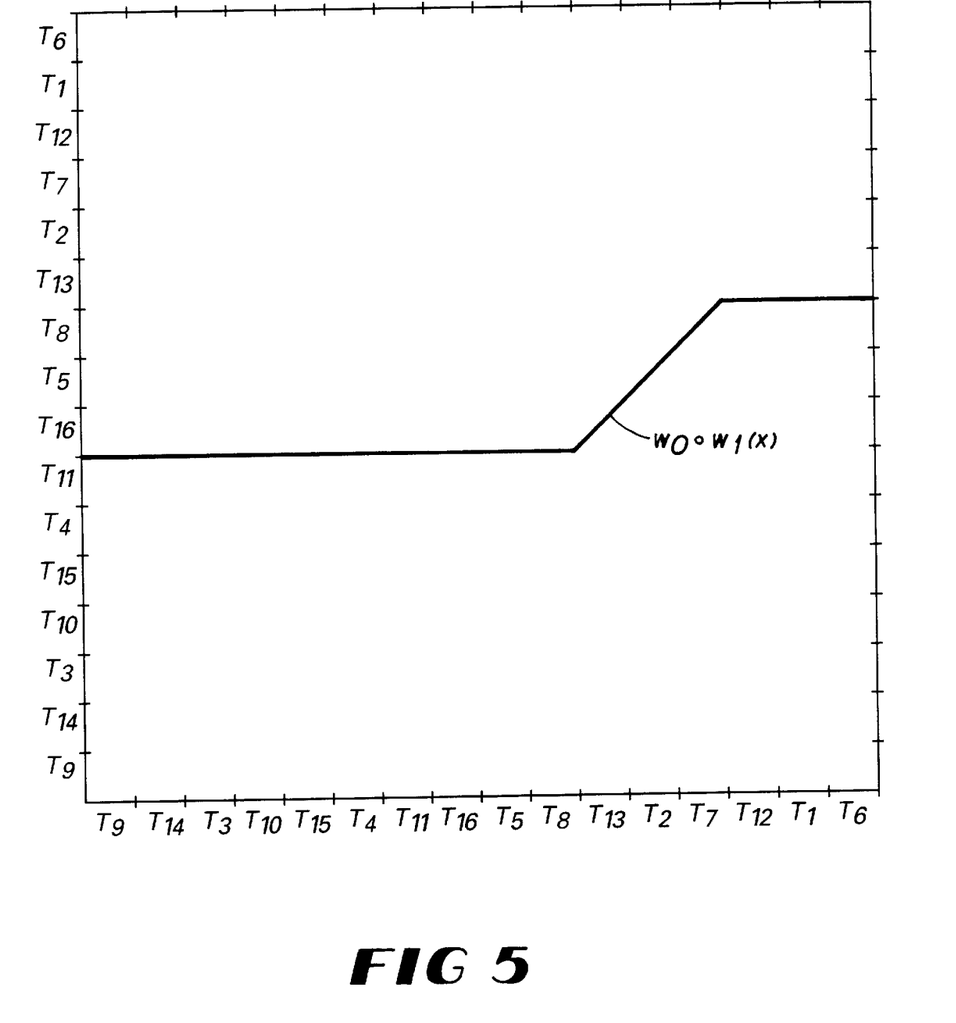
FIG. 5 is a graphical depiction of a composition based on the mapping functions shown in FIG. 4.

The graph of $w_0 \cdot w_1$ as shown in FIG. 5 indicates the string 01 is represented by the interval [6/16,9/16]. However, this interval does not fit within a dyadic interval. A dyadic interval are those intervals within the interval [0,1) which satisfy the condition $1/2^k$ where k is the number of symbols in a string. For the example, k=2 and the dyadic intervals would be the one quarter intervals comprising [0,1]. Since the interval [6/16,9/16] does not fit within one of those intervals or the intervals from which they were derived, namely, [0,1/2] and [1/2,1], the compressor computes the composition corresponding to the application of the mapping function w for the next symbol s to $w_0 w_1$. Once the application of a mapping function to a previously computed composition defines an interval within the set of dyadic intervals for the number of symbols processed thus far, a string representing the symbol string may be transmitted. For example, if the composition example shown in FIG. 5 had defined an interval [1/8,3/8] then because the interval lies within the dyadic interval of [0,1/2] the bits defining that interval may be transmitted to a decompressor. Subsequent symbols in the string further define the interval that represents the string that lies within the interval [0,1/2].

Once the mapping functions generated by mapping function generator 18 are incorporated in a compressor, datastreams output by the data source which provided the representative datastream may be compressed. The process for compressing a datastream (FIG. 6) may be expressed at the kth iteration as receiving a data symbol, $s_k$, (Block 50), update the composition operation f(Block 54) by applying the mapping function which corresponds to the value of the data symbol ($f=f \cdot w_{sk}$), shifting out the digits of the resulting interval address (Block 56) that have stabilized (o=o(k)), and the resulting address is then renormalized ($f=R_k \cdot f$) (Block 60). In the equations which describe this process, f denotes the interval defined by the composition operation. To prevent the digital representation of the interval address from requiring more than sixteen bits, the system and method of the present invention, preferably, renormalize the interval identified by the composition operation to the [0,1) interval. Renormalization is required because an increase in the number of symbols in the datastream to be compressed decreases the size of the interval which represents the datastream which, in turn, increases the number of bits required to define the interval address. The process continues until no more data symbols remain in the datastream to process.

Figure 6:
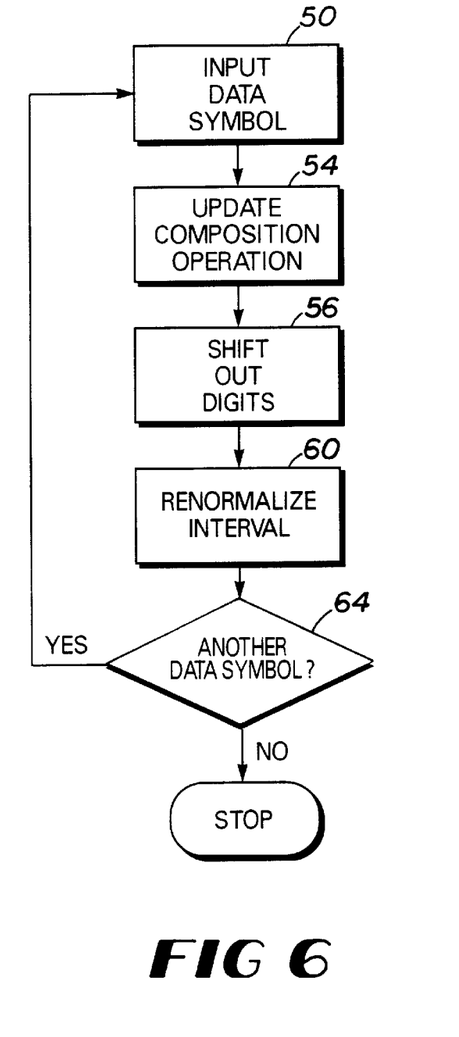
FIG. 6 is a flowchart of a compression process using mapping functions determined in accordance with the principles of the present invention.

Renormalization includes two elements. The first element is the shifting of bits representing an interval endpoint following the storage of bits that define a dyadic interval. This element is performed by shifting in bits according to the function S(x) which is comprised of:

$S_0(x), 0 \leq x \leq 1/2$ $S_1(x), 1/2 \leq x < 1$ where $S_0(x)=2x$ and $S_1(x)=2x-1$ or in binary $S_0$ is the operation of shifting '0' out of the most significant bit position and $S_1$ is the operation of shifting '1' out of the most significant bit position. The renormalization mapping function is a composition of $S_0$, $S_1$ and an interval adjusting function G(x) where G(x)=2x-1/2. Thus, a renormalization $R=G \cdot S_{d1} \cdot S_{d2} \cdot \ldots \cdot S_{dm}$ where G may be applied to an address one or more times and $S_{d1}$ etc. represent the shifting operation which corresponds to the digit shifted out of the address.

For example, processing of the next symbol $s_k$ in a datastream may result in the application of a corresponding mapping function which generates an interval with left and right endpoints defined by the addresses:

left endpoint node=1100101100000000 right endpoint node=1100110000000000 and count=3

The variable count indicates the number of underflow bits counted which have not yet resulted in the interval being within a dyadic interval. In this example, the left and right endpoints both begin with a '1' so the interval lies within the dyadic interval [1/2,1) and a '1' may be transmitted or stored for the string being processed. This output bit is followed by three output '0' bits which correspond to the count variable value. The '0' value is used to move the left endpoint into the interval [0,1/2]. The remaining bits in the addresses of the two endpoints, starting from the left, which are the same, indicate stability of the interval address and they may be shifted out of the address into the output string. In the example noted above, the output string corresponding to all of these actions is 10001001.

The remaining endpoint address values now are:

left endpoint node=0110000000000000 right endpoint node=1000000000011111

For these values, the first bits indicate the interval is located across the halfway point of the [0,1] interval. To renormalize the interval so that it resides in a dyadic interval, the G function is applied to the interval until this condition is reached. Here, the G function is applied twice to achieve that function so count is set equal to 2. These bits are then removed from each endpoint address and the number of bits needed to form a sixteen bit value are shifted into the least significant bit positions. For the address of the left endpoint the values shifted in are '0' and for the right endpoint the values are '1'. This further ensures that the interval approximates the [0,1) interval. In the example, the interval resulting from the renormalization $R = G \cdot G \cdot S_1 \cdot S_0 \ S_0 \cdot S_1 \cdot S_1 \cdot f$ has the address values:

left endpoint node=0000000000000000 right endpoint node=1000000001111111

Compression continues by receiving the next symbol in the string being compressed and following the steps until all of the symbols in the datastream have been processed.

Figure 7:
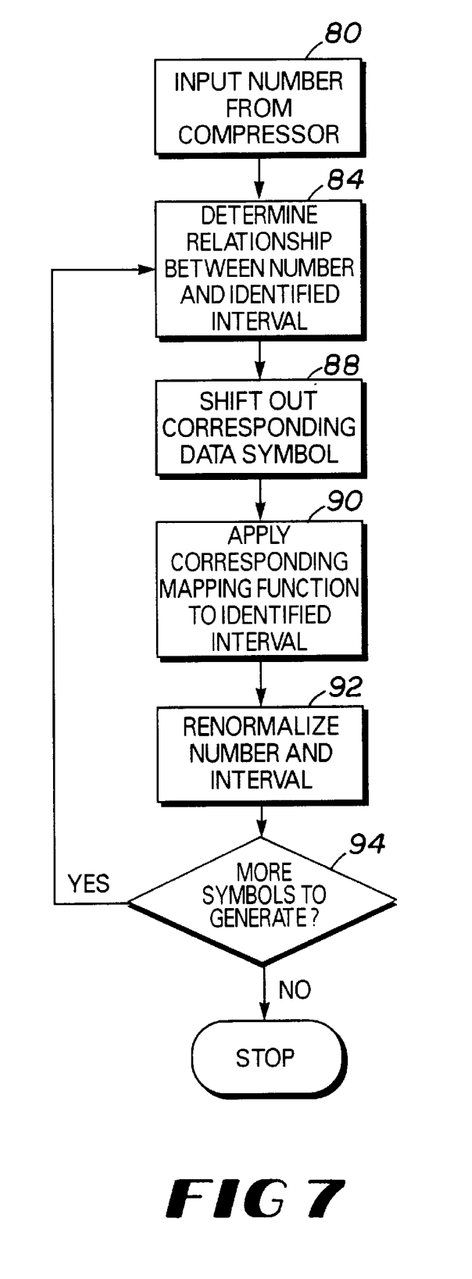
FIG. 7 is a flowchart of a decompression process using mapping functions determined in accordance with the principles of the present invention.

The decoder operation is the inverse of the encoder operation. The process is shown in FIG. 7. First, the process receives a number c from compressor 20 (Block 80) and determines the relationship between c and the interval identified by the decompressor (Block 84). The identified interval is $f_{k-1} \cdot w_0[0,1)$ which is the interval identified by the previous iteration of the composition operation performed by decompressor 24. If the number is less than the interval, a data symbol of value '0' is shifted out and if the number is more than the interval, a data symbol of value '1' is shifted out (Block 88). Specifically, if $c < f_{k-1} \cdot w_0[0,1)$ then '0' is shifted out and if $c > f_{k-1} \cdot w_1[0,1)$ then '1' is shifted out. Then, the mapping function corresponding to the shifted out digit is selected. For the '0' digit, $w_0$ is selected and for '1', $w_1$ is selected. The selected mapping function is used to update the composition operation ($f = f_k \cdot w_{sk}$, where $w_{sk}$ is the mapping function corresponding to the data symbol shifted out) to determine the next interval (Block 90). The composition operation which determines the next interval is renormalized ($f = R_k \cdot f_k$) and the number c is also renormalized ($c = R_k(c)$) (Block 92). The renormalized c is processed at the next iteration, if there is one. The process continues until all of the data symbols for the compressed datastream have been generated (Block 94). Preferably, the number of symbols to be generated is passed as a parameter with c and the number decremented after each iteration until it reaches zero.

In use, a user captures a sample datastream from a data source and determines the mapping functions for an optimal data set transformation function which correspond to the representative datastream. These mapping functions are incorporated in a compressor and a decompressor of a compressor/decompressor combination. Thereafter, datastreams are input to the compressor which use the mapping functions of the optimal data set transformation function to determine composition operations which identify an interval of an attractor, the address of which may be used to represent the stream or a portion of the stream. This representation is provided to a decompressor which uses the number or a portion of the number generated by the compressor to generate the data symbols of the compressed datastream. The symbols are generated by determining the relationship between the number generated by the compressor and an interval defined by the composition operation in the decompressor. The mapping function which corresponds to the generated data symbol is then applied in the composition operation to the interval and the resulting interval and number are renormalized to generate the identified interval for the next iteration. The process continues until all of the data symbols of the compressed datastream have been generated.

While the present invention has been illustrated by a description of preferred and alternative embodiments and processes, and while the preferred and alternative embodiments and processes have been described in considerable detail, it is not the intention of the applicant to restrict or in any way limit the scope of the appended claims to such detail. Additional advantages and modifications will readily appear to those skilled in the art. For example, instead of intervals on a one dimensional attractor being used to represent a datastream, attractors in multiple dimensions may also be used.

What is claimed is:

1. A method for compressing digital datastreams from a data source comprising the steps of:

capturing a representative datastream from a data source;

determining an optimal data set transformation function from said representative datastream, said optimal data set transformation function having mapping functions determined from said datastream by ordering intervals of an attractor in correspondence with the values and order of data in said datastream; and incorporating said optimal data set transformation function in a compressor/decompressor combination to be used to compress datastreams from said data source.

2. The method of claim 1, further comprising the steps of:

enumerating cyclic permutations of said representative datastream;

ordering said cyclic permutations according to their magnitude; and ordering intervals of an attractor according to the correspondence between said intervals and said cyclic permutations.

3. The method of claim 1 said determining step further comprising the steps of:

grouping digits in said datastream as vectors; and ordering said vectors to identify an order of intervals of an attractor to define mapping functions which comprise said optimal data set transformation function.

4. The method of claim 3 wherein said mapping functions comprise an iterated function system.

5. The method of claim 3 wherein said intervals of said attractor are ordered according to a composition operation.

6. The method of claim 5 wherein said composition operation is comprised of the steps of:

applying one of said mapping functions from said optimal data set transformation function to one of said intervals to determine a next interval in said order.

7. The method of claim 3 wherein there are as many intervals of said attractor as there are digits in said representative datastream.

8. The method of claim 1 further comprising the steps of:

compressing a datastream from said data source using said optimal data set transformation function incorporated in a compressor of said compressor/decompressor combination by generating an address of an interval which represents said datastream.

9. The method of claim 8 wherein said address is of an invariant interval in response to said datastream corresponding to said representative datastream.

10. The method of claim 9 wherein said address of said invariant interval is ≈$\log_2 n$ digits in length where n is the number of data symbols in said datastream being compressed.

11. The method of claim 8, said compressing step further comprising the steps of:
   receiving a data symbol in said datastream;
   selecting a mapping function from said optimal data set transformation function which corresponds to said received data symbol;
   determining one interval of said attractor by applying selected mapping function to a previous interval;
   shifting out digits representing an address of said determined interval; renormalizing said determined interval; and
   repeating said receiving, selecting, determining and renormalizing steps until all of said data symbols in said datastream are processed.

12. The method of claim 11 wherein said previous interval for said first received data symbol is the interval [0,1).

13. The method of claim 11, said renormalizing step comprising the steps of:
   shifting out digits of a stable portion of said address;
   shifting out digits representing an underflow count;
   applying an interval adjusting function until said determined interval has a length greater than one half of said attractor;
   shifting out digits generated by application of said interval adjusting function; and
   generating an underflow count corresponding to a number of times said interval adjusting function is applied to said determined interval.

14. The method of claim 1 further comprising the steps of:
   decompressing a datastream compressed by a compressor incorporating said optimal data set transformation function by determining data symbols generated by a response of a dynamical system in a decompressor of said compressor/decompressor combination, said dynamical system corresponding to the inverse of said optimal data set transformation.

15. The method of claim 14 further comprising the steps of:
   receiving a number from a compressor of said compressor/decompressor combination;
   determining whether said number is within one of a lower and an upper portion of an interval identified by said dynamical system;
   shifting out a data symbol corresponding to said determined portion of said interval;
   renormalizing said next interval to identify a new interval for said dynamical system;
   renormalizing said received number; and
   repeating said receiving, determining, shifting, generating and renormalizing steps until all data symbols for a datastream represented by said received number have been generated.

16. The method of claim 3 wherein said mapping functions are piecewise linear functions having a slope of 0 over intervals of said attractor where one of said mapping functions is not applied and a slope of 1 over intervals of said attractor where one of said mapping functions is applied.

17. A system for compressing and decompressing a datastream from a data source comprising:
   a compressor incorporating an optimal data set transformation function determined from a representative datastream from a data source, said optimal data set transformation function having mapping functions determined from said datastream by ordering intervals of an attractor in correspondence with the values and order of data in said datastream, said compressor generating numbers which represent a datastream from said data source; and
   a decompressor incorporating said optimal data set transformation function, said decompressor generating data symbols of a datastream from a number received from said compressor.

18. The system of claim 17 further comprising:
   a buffer for capturing a representative datastream from said data source;
   a data symbol arranger for ordering strings of said representative datastream; and
   a mapping function generator for generating mapping functions to define said optimal data set transformation function from said ordered strings, said mapping functions being used in composition operations performed by said compressor and said decompressor to compress and decompress datastreams from said data source.

19. The system of claim 17 wherein said compressor and decompressor determine intervals of an attractor to compress and decompress datastreams.

20. The system of claim 19 wherein said intervals are represented using sixteen bit integers; and
   said intervals are renormalized to conform addresses of said intervals to sixteen bits.

21. A method for compressing digital datastreams from a data source comprising the steps of:
   capturing a representative datastream from a data source;
   determining a data set transformation function from said representative datastream;
   incorporating said data set transformation function in a compressor/decompressor combination to be used to compress datastreams from said data source;
   enumerating cyclic permutations of said representative datastream;
   ordering said cyclic permutations according to their magnitude; and
   ordering intervals of an attractor according to the correspondence between said intervals and said cyclic permutations.

22. A method for compressing digital datastreams from a data source comprising the steps of:
   capturing a representative datastream from a data source;
   determining a data set transformation function from said representative datastream;
   incorporating said data set transformation function in a compressor/decompressor combination to be used to compress datastreams from said data source;
   grouping digits in said datastream as vectors; and
   ordering said vectors to identify an order of intervals of an attractor to define mapping functions which comprise said data set transformation function.

23. A method for compressing digital datastreams from a data source comprising the steps of:
   capturing a representative datastream from a data source;
   determining a data set transformation function from said representative datastream;
   incorporating said data set transformation function in a compressor/decompressor combination to be used to compress datastreams from said data source;

compressing a datastream from said data source using said data set transformation function incorporated in a compressor of said compressor/decompressor combination by generating an address of an interval which represents said datastream receiving a data symbol in said datastream;

selecting a mapping function from said data set transformation function which corresponds to said received data symbol;

determining one interval of said attractor by applying selected mapping function to a previous interval;

shifting out digits representing an address of said determined interval;

renormalizing said determined interval; and repeating said receiving, selecting, determining and renormalizing steps until all of said data symbols in said datastream arc processed.

24. A method for compressing digital datastreams from a data source comprising the steps of:

capturing a representative datastream from a data source;

determining a data set transformation function from said representative datastream;

incorporating said data set transformation function in a compressor/decompressor combination to be used to compress datastreams from said data source;

decompressing a datastream compressed by a compressor incorporating said data set transformation function by determining data symbols generated by a response of a dynamical system in a decompressor of said compressor/decompressor combination, said dynamical system corresponding to the inverse of said data set transformation system;

receiving a number from a compressor of said compressor/decompressor combination;

determining whether said number is within one of a lower and an upper portion of an interval identified by said dynamical system;

shifting out a data symbol corresponding to said determined portion of said interval;

renormalizing said next interval to identify a new interval for said dynamical system;

renormalizing said received number; and repeating said receiving, determining, shifting, generating and renormalizing steps until all data symbols for a datastream represented by said received number have been generated.

25. A system for compressing and decompressing a datastream from a data source comprising:

a compressor incorporating a data set transformation function determined from a representative datastream from a data source, said compressor generating numbers which represent a datastream from said data source;

a decompressor incorporating said data set transformation function, said decompressor generating data symbols of a datastream from a number received from said compressor;

a buffer for capturing a representative datastream from said data source;

a data symbol arranger for ordering strings of said representative datastream; and a mapping function generator for generating mapping functions to define said data set transformation function from said ordered strings, said mapping functions being used in composition operations performed by said compressor and said decompressor to compress and decompress datastreams from said data source.

26. A system for compressing and decompressing a datastream from a data source comprising:

a compressor incorporating an data set transformation function determined from a representative datastream from a data source, said compressor generating numbers which represent a datastream from said data source, said compressor determining intervals of an attractor to compress said datastreams, wherein said intervals are represented using sixteen bit integers and said intervals being renormalized to conform addresses of said intervals to sixteen bits; and a decompressor incorporating said data set transformation function, said decompressor generating data symbols of a datastream from a number received from said compressor.

* * * * *